Jan. 17, 1961 — L. F. HOTZ — 2,968,404

FILTER

Filed May 5, 1958

INVENTOR.
LEO F. HOTZ

BY D. Gordon Angus
ATTORNEY

United States Patent Office 2,968,404
Patented Jan. 17, 1961

2,968,404
FILTER
Leo F. Hotz, 1706 N. Catalina, Burbank, Calif.
Filed May 5, 1958, Ser. No. 733,071
2 Claims. (Cl. 210—334)

This invention relates to a swimming pool filter.

A commercially feasible filter for a swimming pool should be small in bulk, large in through-put capacity, and cause the least possible pressure drop in the fluid being pumped through it. In addition, the filter should allow for easy clean-out, and for ease in repair and replacement of its parts. These desirable properties are provided in the instant invention.

A swimming pool filter according to this invention is incorporated in a tank having an inlet, an outlet, and a drain. Filter bags are freely suspended in the tank, and are preferably, though not necessarily, connected to a manifold, which manifold is connected between the outlet and the insides of the filter bags. The filter bags comprise a porous cover which encloses a porous spacer means that prevents the filter bag from collapsing.

According to a feature of the invention, the inlet discharges its water into the tank at a level above the filter bags, so that when the drain is open and the tank is substantially empty, water discharged into the tank from the inlet flows over the outside of the bags to wash their outer surfaces clean of filtered solids.

Still another feature of this invention resides in making the filter bags flexible so that they can be inserted in the tank through a comparatively small access port therein, thereby enabling a small, self-sealing plug to be used to seal the tank, instead of a hinged cover, as has been customarily used in the art.

The above and other features of this invention will be fully understood from the following detailed description and the accompanying drawings, of which:

Figure 1:
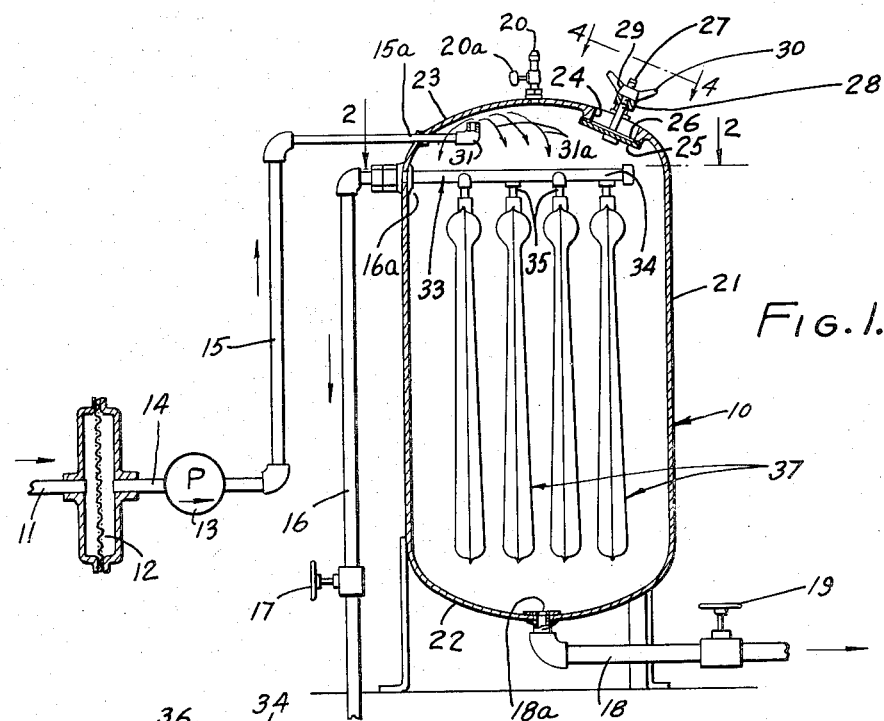
Fig. 1 is an elevation partly in cross-section and partly in schematic notation showing a filter system according to the invention.

A tank 10 houses the filter portion of the presently preferred embodiment of the filter system. A water supply pipe 11 which may draw water from the swimming pool or from the water mains, is connected to a screen 12 which sieves out large particles from the water supplied by pipe 11. A pump 13 is provided for circulating the water. A pipe 14 and an inlet pipe 15 connect the pump to the screen and to the inlet 15a of the tank, respectively. An outlet pipe 16 conveys filtered water from the tank outlet 16a back to the swimming pool. A shut-off valve 17 is connected in pipe 16. Inlet 15a and outlet 16a are disposed at upper levels of the tank. A drain pipe 18 is connected to a drain 18a at the bottom of the filter. A drain valve 19 is connected in drain pipe 18. An air vent 20 with a vent valve 20a is placed at the top of the tank.

Figure 4:
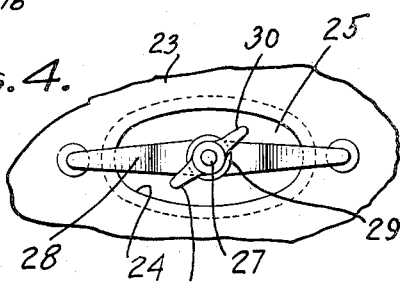
Fig. 4 is a view taken at line 4—4 of Fig. 1.

Tank 10 may be constructed according to well known steam boiler design principles. Such a tank ordinarily has a cylindrical side 21, a bottom 22 and a dome shaped top 23, the side, bottom and top ordinarily being formed as a continuously welded structure. An access port 24 (see Fig. 4) is cut in the top 23. This access port preferably has an elliptical shape with a major axis and a minor axis. A smaller elliptical plug 25, which also has a major axis and a minor axis, is provided for closing the access port. The minor axis of the plug is smaller than the major axis of the access port, so that with major axes crossed, the plug can pass through the port. Then, when the plug is inside the tank, it is turned so that its major axis is parallel to the major axis of the access port, and the plug thereby overlaps the access port so as to close the same. The major and minor axes of the plug are greater than the corresponding axes of the access port. A sealing ring 26 may be placed between the plug and the inner wall of the top of the tank, around the access port, for sealing purposes. It will be observed that increasing pressure in the tank exerts an increasing force on the plug, so that the greater is the pressure in the tank, the firmer is the seal made by the plug.

The plug 25 has a threaded stud 27 which projects outward through the access port when the plug is in place. A spider 28 is spindled on the stud, and a hold-down nut 29 provided with handles 30 is spun down against the spider so as to draw the plug tightly against the inside wall of the tank.

A distributor 31 inside the tank is connected to pipe 15 through inlet 15a. The distributor is preferably an open-ended pipe which discharges upwardly into the tank. In this way, when the tank is filled the downward flow of water is very diffused, and has no appreciable tendency to wash down the bags at that time. If the distributor discharged downwardly, it would tend to create water currents over the bags which would wash them down. This would be undesirable, because it is an aid to filtration to maintain at least a small filter cake on the surface of the filter bags during filtering operations. When the cake becomes so thick that it hampers filtration, it can be removed by opening the drain to let the water out of the tank and then letting water in through the distributor, which, when the tank is empty, impinges on and flows over the bags in a manner such as to remove the filter cake. Also, it tends to buffet the flexible bags, thereby exerting mechanical forces which further tend to loosen and remove the cake. The dribbling water spray, shown by arrows 31a, washes down the bags to clean them.

Figure 2:
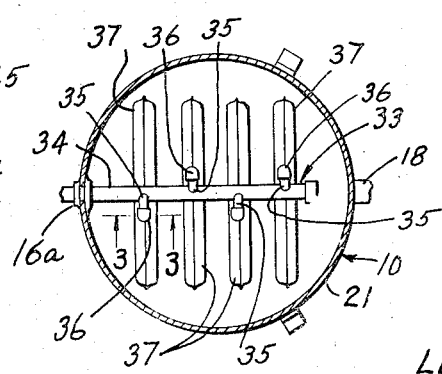
Fig. 2 is a cross-section taken at line 2—2 of Fig. 1.

A manifold 33 is disposed below the level of the water distributor. As best shown in Fig. 2, this manifold comprises a central pipe 34 which connects with the outlet pipe 16 through the outlet 16a of the tank. The central pipe 34 has four branches 35 which alternately project from opposite sides of the central pipe. The end of the central pipe not connected to the outlet pipe is capped.

A 90° elbow 36 is connected to each of the branches 35, and a filter bag 37 is freely suspended from each elbow. The filter bags are thereby supported by the manifold, and their loose ends dangle free.

Figure 3:
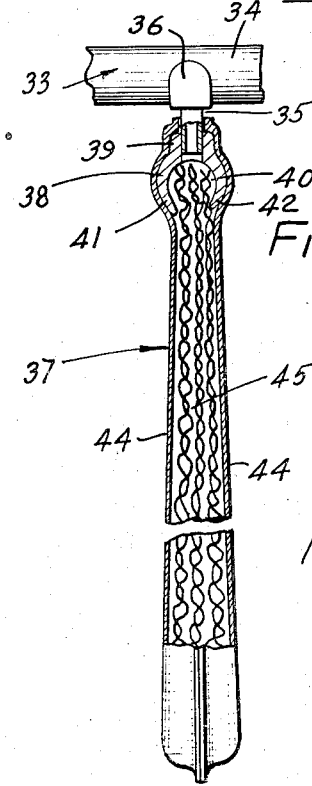
Fig. 3 is a cross-section taken at line 3—3 of Fig. 2.

One of the filter bags 37 is shown in detail in Fig. 3. It is supported from a longitudinal clamp 38 (sometimes called "suspension means"), which clamp has a nipple 39 that is attached to the lower end of elbow 36. The nipple has a passageway (sometimes called "conduit means") for connecting the elbow to a longitudinally extending cavity 40 in the clamp. The clamp has arms 41, 42 which yield slightly to accommodate and clamp onto the upper end of part of the porous filter bag 37. This porous structure comprises an outer cloth layer 44 which may, if desired, be simply a stitched-up enclosure comprising a single sheet of cloth. The presently preferred cloth is woven of monofilament polyethylene fibre, 177 x 90 mesh. This cloth can be sewed on an ordinary sewing machine to form a bag-shaped enclosure.

The cloth layer must be supported in the center, for if it were not, the layers of cloth on the opposite sides of the bag would simply collapse against each other, and would not perform any filtering action. This central support is provided by a spacer layer 45. This spacer layer is porous so as to permit flow of filtered liquid from the entire area of the cloth to pass through the spacer layer to the cavity 40 in the clamp 38. The cloth layer is stitched over the spacer layer to enclose the same. The arms 41, 42 clamp over the upper end of the spacer layer 45.

The presently preferred material for the spacer layer is a polyethylene mesh made by Chicopee Mills, Inc., 47 Worth Street, New York 13, New York. This polyethylene mesh is made of a comparatively rigid monofilament which is woven in coarse intersecting patterns so as to provide substantially more volume of void than of polyethylene fibre in the mesh. This mesh has considerable rigidity and it is possible for a large man to stand on a quarter inch layer of the same without substantially deforming it. Because of the complexity of its weave, and because other type porous spacer layers would also provide many of the advantages of this invention, the weave of the preferred mesh is shown only schematically in Fig. 3.

Figure 5:
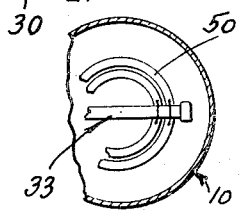
Fig. 5 is a partial cross-sectional view showing a tank using a modified configuration of a filter bag according to the invention.

An additional advantage of the particular preferred mesh resides in its flexibility. While the aforesaid polyethylene mesh is strong enough that it is not readily compressed by forces encountered in filter installations, it is flexible enough to be rolled up. When rolled up, the filter bags can be inserted into the tank through the small access port. These flexible bags can also be rolled up or curled, in the manner shown by filter bag 50 in Fig. 5, so as to present an increased filtering surface in a tank of a given size, as compared to the amount of filtering surface attainable in the same tank with flat bags.

The polyethylene material used for the cloth layer and for the spacer layer is substantially inert to water and to the usual swimming pool additives, such as chlorine and the like, so that the filter bags have a very long life. The manifold, the elbows and the clamps 38 may also conveniently be made out of polyethylene, so that they too are resistant to corrosion.

The operation of this filter will now be described. After a period of operation which depends on the rate at which foreign matter accumulates in the pool, the filter bags tend to become clogged, and it is desirable to clean them. At this time, valve 17 is closed and drain valve 19 and vent valve 20a are opened. The contents of the tank then drain out of the tank. Thereafter, when the pump is operated, water flows from the distributor, which is disposed above the bags, over the outer surface of the bags, washing them clean. The solids washed off the filter bags are carried away by the effluent water through the drain pipe 18. None of the effluent flows to the pool at this time. When the bags are thoroughly cleaned, the drain valve and vent valve are closed, the shut-off valve 17 is opened, and the filter is again in full operation, supplying filtered water to the swimming pool.

A filter assembly according to this invention provides many advantages over conventional filters. In conventional filters which utilize filter bags, it has been customary to make the filter bag a self-supporting member which is attached to the bottom of the tank and which projects upwardly into the tank from the bottom thereof. Accordingly, it was necessary to provide access means to the tank which were large enough to pass a rigid filter bag of appreciable size. In turn, this required the use of a tank which differs markedly from tank 10. The conventional tank has had a cylindrical side and a dome shaped top which was hinged to said side, a sealing ring being provided between the top and the side. Clamp means were furnished to clamp the top to the side. Water pressure inside this type of closure tends to open the tank by lifting the top, and the leakage past the seal has been a continuous source of annoyance. As a practical matter, this annoyance could not be avoided so long as it was necessary to utilize large rigid frames for filter bags, wherein the rigid frame was placed inside the bag to enable it to be supported from the bottom of the tank, and to resist the large forces which tended to collapse the bag.

When utilizing a flexible filter bag according to this invention, it is possible to insert the bag into the tank through a very small access port. This feature enables tanks to be used of the sort commonly utilized in steam boilers, wherein, instead of providing a hinged member which must be clamped shut, a plug is placed inside the rigid wall of the enclosure which seals more tightly as the pressure inside the tank increases. This construction eliminates leakage, because the greater the pressure, the tighter the seal. In addition, this construction is much cheaper.

The flexible bag of this invention provides suitable means for supporting the cloth layers, and also inherently causes a smaller pressure drop than conventional bags, thereby reducing the collapsing forces which must be withstood.

In addition, previously known filters have required a filter cake of diatomaceous earth to be applied to the surface of the filter bag in order to achieve suitable filtration. Such a filter cake causes an appreciable pressure drop across the filter bag, and thereby requires an increased amount of work to move the water through the filters. The monofilament mesh construction of the cloth layer of the filter bags according to this invention has been found to provide a uniform filtering action down to 35 microns without requiring any filter cake thereon. When these bags become slightly dirty after filtering for a while, it has been found that 10 micron filtration is achieved. 10 micron filtration is as good as is available with a diatomaceous earth cake on conventional filters. Of course, a diatomaceous earth cake could be used on the filter bags according to this invention, but there would be no point in using the same, because no improvement in filtration would result, and an increased pressure drop would be caused. The elimination of the need for a diatomaceous earth coating in these filter bags, without substantial loss of filter efficiency, is of considerable practical importance in swimming pool filters.

It has also been found that the flexibility of these bags enables the bags to be cleaned easier than rigid bags, because when they are being washed down, the force of the water from the distributor tends to flap the bags around, thereby bending their surfaces so as to tend to release the solid particles therefrom.

This invention is not to be limited by the embodiments shown in the drawings and described in the description, which are given by way of example and not of limitation, but only in accordance with the scope of the appended claims.

I claim:

1. A swimming pool filter comprising: a totally enclosed tank having an access port therein; closure means for closing said access port; an inlet through said tank adapted to receive water for introduction into the tank; a distributor in said tank adjacent the top thereof which is connected to the inlet and discharges water to be filtered into said tank, the distributor being located near and directed toward the top of the tank; an outlet and a drain through said tank; a plurality of filter bags in said tank, each filter bag having two dimensions greater than the greatest dimension of the access port, each filter bag comprising a flexible porous spacer layer and a cloth layer enclosing said spacer layer, each filter bag being sufficiently flexible that it can be bent to dimensions small enough to pass through the access port; a manifold connected to said outlet, and to the spacer layer of each filter bag, the manifold serving to freely suspend the filter bags in the tank beneath the distributor so that the hanging ends of the bags are free to move, and the bags are free to bend; a pump for forcing water into the inlet; and a shut-off valve in the outlet and in the drain; whereby with the drain closed and the outlet opened, water to be filtered may be pumped into the tank to maintain the water level above the filter bags, water being filtered by the cloth layers and flowing out the outlet, solids being collected on the filter bags, and whereby with the outlet closed and the drain opened, water pumped into the inlet serves to buffet and wash down the outsides of the filter bags so as to flush the solids off the bags and out the drain.

2. Apparatus according to claim 1 in which the closure means comprises a plug insertable through the access port, and having greater corresponding dimensions than the access port, and means for holding the access plug against the inside wall of the tank to close the access port.

References Cited in the file of this patent

UNITED STATES PATENTS

| | | |
|---|---|---|
| 516,439 | Jensen | Mar. 13, 1894 |
| 574,420 | Heiser | Jan. 5, 1897 |
| 589,528 | Hegewald | Sept. 7, 1897 |
| 610,527 | Fischer | Sept. 13, 1898 |
| 1,673,572 | Liddell | June 12, 1928 |
| 1,724,436 | Sweetland | Aug. 13, 1929 |
| 2,093,894 | Mojonnier | Sept. 21, 1937 |
| 2,409,705 | Reinhardt | Oct. 22, 1946 |
| 2,468,296 | Jacobowitz et al. | Apr. 26, 1949 |
| 2,540,362 | Winslow et al. | Feb. 6, 1951 |